Figure 1:
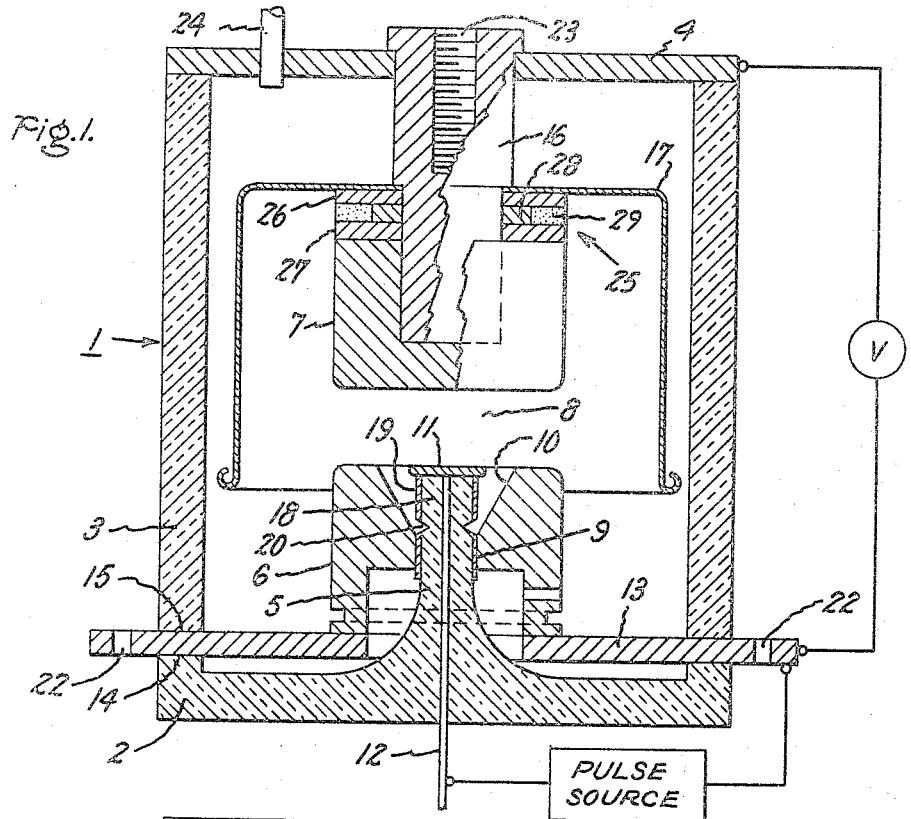

Inventor:
James M. Lafferty,
by John F. Ahern
His Attorney.

United States Patent Office 3,331,988
Patented July 18, 1967

3,331,988
TRIGGERED VACUUM GAP DEVICE WITH RARE EARTH TRIGGER ELECTRODE GAS STORAGE MEANS AND TITANIUM RESERVOIR
James M. Lafferty, Schenectady, N.Y., assignor to General Electric Company, a corporation of New York
Filed July 14, 1966, Ser. No. 565,204
8 Claims. (Cl. 315—330)

The present invention is a continuation-in-part of my copending application, Ser. No. 422,373, filed Dec. 30, 1964, which is assigned to the present assignee. This invention relates to electric discharge devices adapted to switch high voltages and currents by triggering electric breakdown between a pair of electrodes separated by a gap in vacuo and more particularly relates to an improvement thereof adapted for use over extended periods of time.

In my U.S. Patent 3,087,092, issued Apr. 23, 1963, and assigned to the assignee of the present application, there is disclosed a triggerable vacuum discharge device which comprises a pair of primary discharge electrodes, fabricated from gas-free metal, separated by a primary gap and disposed in a pressure of $10^{-5}$ millimeters of mercury or less. A trigger device, including gas-charged metal members and having a gap across which a discharge is easily started, is provided to release and ionize gas from the metal members and direct the charged particles thereof into the gap between the primary discharge electrodes to cause the primary gap to be broken down by imposition of a high voltage across the primary electrodes. When the primary discharge is terminated, the primary gap clears quickly due to diffusion of the vaporized electrode material which supports the primary discharge and due to absorbing of the gas by the trigger metal and evaporated electrode material so that the high dielectric strength of the original evacuated gap is reestablished rapidly. Until the trigger discharge is initiated again, the primary gap withstands very high voltages without breakdown. In one specific embodiment of the patented invention the trigger metal is titanium.

In one fabrication process, the device of the aforementioned patent is evacuated by baking out at 400° C. or higher depending on whether hard glass or ceramic construction is used while being pumped. After bakeout the trigger electrode is outgassed at a temperature of about 1000° C. by passing current through a heater winding. After outgassing, hydrogen is let into the system and the trigger is allowed to cool slowly. Hydrogen is taken up by the titanium and the trigger is "loaded." The device is then baked out again while being vacuum pumped at a moderate temperature of about 200° C. which is high enough to remove a considerable amount of sorbed gas from the electrodes and tube walls, but not high enough to remove appreciable hydrogen from the trigger electrode. After cooling and low current sparking with high voltage, the exhaust tubulation is pinched off and the device sealed.

The present invention is directed to a device which may be construced by a process which requires fewer steps which produces a more thorough evacuation, and which is adapted to longer duty-cycle operation.

Accordingly, it is an object of the present invention to provide triggerable vacuum discharge devices which are less expensive, the construction of which is less time consuming and which requires fewer steps to construct, and have a longer duty life.

Another object of the present invention is the provision of an improved trigger element for a triggerable vacuum discharge device which simplifies the construction thereof.

A further object of the present invention is the provision of triggerable vacuum discharge devices which may be more completely evacuated than previous devices, and are adapted to store more active gas than devices of the prior art.

Briefly, in accord with one aspect of the present invention, I provide a triggerable vacuum discharge device having incorporated therein a trigger element which comprises a ceramic member and a metallic coating. In accord with the present invention, the coating comprises a metal which absorbs active gasses and which can be heated to higher temperatures than those previously utilized without removing the gas therefrom so as to permit a higher temperature bakeout of the device without loss of the gas in the trigger. Specifically, the metals which are suitable in the practice of this invention include yttrium, erbium, holmium, lutetium, dysprosium, thulium and scandium. Additionally, I incorporate within the envelope an active gas adsorbing and storage member which takes on and releases active gas at a substantially lower temperature than the metal of the trigger electrode to facilitate evacuation thereof during fabrication and to permit recharging of the trigger electrode constantly during operation.

Figure 2:
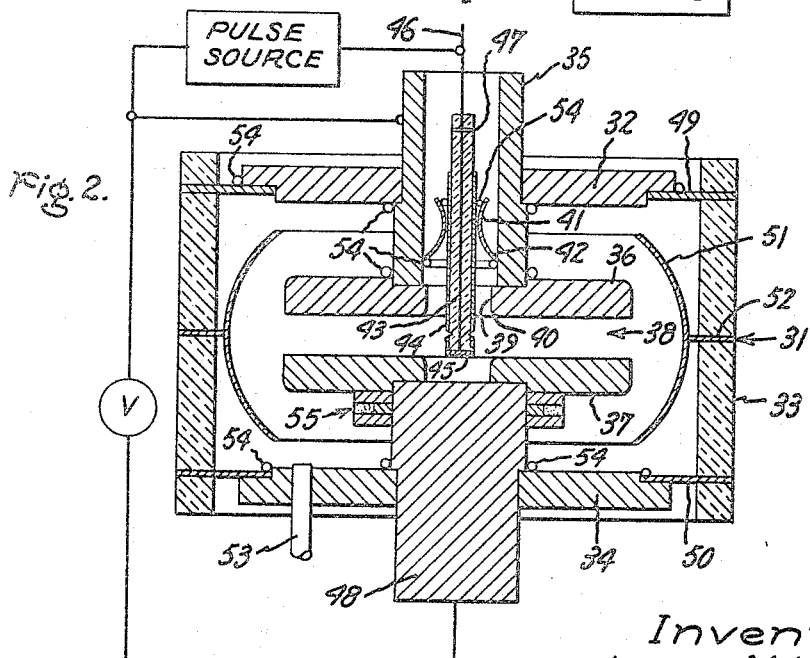

The novel features believed characteristic of the invention are set forth in the appended claims. The invention itself, together with further objects and advantages thereof may best be understood by reference to the following description taken in connection with the appended drawings in which:

FIGURE 1 is a vertical cross-sectional view of a gap discharge device constructed in accord with the present invention, and FIGURE 2 is a vertical cross-sectional view of an alternative embodiment of the invention.

The device of FIGURE 1 includes a gas-impervious insulating envelope 1 which is composed of a lower flanged disc end-wall assembly 2, a cylindrical sidewall member 3 and an upper end plate 4. Lower end plate assembly 2 includes an integral protruding member 5 which constitutes a portion of a trigger electrode assembly for the device. A pair of gap electrodes 6 and 7 are supported in spaced-apart relation within envelope 1 to define a primary gap 8. Cathode electrode 6 comprises a half cylindrical section having an apertured closed end. The aperture in cathode electrode 6 is tapered outwardly at the exterior portion thereof to provide a bore in the end of electrode 6 having an interior cylindrical portion 9 and an exterior portion 10. Electrode assembly 6 is fitted over the inwardly protruding end of member 5. The inward end of member 5 is capped with a metallic disc 11 which is slightly larger in diameter than the diameter of protruding member 5. A conducting lead 12 is soldered, brazed or otherwise firmly and conductively secured to cap 11 and passes through a bored aperture in end wall assembly 2 to the exterior of envelope 1. The side of cap 11 in contact with the inward end of member 5 is hermetically sealed thereto by conventional metal-to-insulator sealing techniques so as to maintain the hermetic seal of envelope 1. Cathode electrode 6 is suspended within envelope 1 upon the inner periphery of an annular copper disc 13 which rests upon the annular upwardly flanged edge of end wall assembly 2. Disc 13 is bonded to assembly 3 at 15 so as to form hermetic seals therewith. Apertured disc end cap 4 is similarly bonded to the opposite end of cylindrical sidewall assembly 3. Anode electrode 7 is suspended within envelope 1 by means of an anode electrode support member 16, which is passed through a central aperture in end cap 4 and hermetically sealed thereto by welding, brazing or other suitable techniques.

A metallic shield 17, having a semi-cylindrical shape with a flared open end to prevent arcing, is suspended from anode electrode support member 16 and extends past the mid-point of the gap between electrodes 6 and 7. Shield 17 is utilized to preclude metal sputtered or evaporated from electrodes 6 and 7 from completely coating the inner surface of cylindrical sidewall portion 3 of envelope 1 and thus destroying the insulating characteristics thereof. Tubulation 24 is used to seal the device to vacuum and may be left open to the atmosphere of the furnace or connected to separate exhaust and gas charging means, as desired.

A secondary reservoir for active gas is provided at 25 located closely between anode electrode 7 and shield 17 so as to be subject to heating from the arc between the primary arc-electrodes. Reservoir 25 includes a pair of annular rings 26 and 27 of larger outer diameter separated by a smaller diameter ring 28, all of which may be of out-gassed stainless steel. Within the annular recess between rings 26 and 27 and exterior of ring 28 is a quantity of low temperature active gas storage metal, 29, as for example titanium, which when fully "loaded" with active gas becomes titanium hydride. To facilitate the absorption of the maximum amount of active gas, metal 29 is in the form of a porous mass, as for example a pressed powder having a very high surface to volume ratio. As a gas reservoir in vacuo, titanium hydride retains substantially all its stored hydrogen up to about 200° C., at which temperature hydrogen begins to evolve. At approximately 300° C. (in vacuo) substantially all the hydrogen will have evolved. These figures are slightly variable, however, depending upon the time to which the temperature is maintained. The absorption of hydrogen by titanium is also within the same approximate range.

In accordance with the present invention, the innermost cylindrical portion 18 of inwardly protruding member 5 is coated with a thin layer 19 of a metal which is selected to have the properties of being highly absorbent of active gasses such as hydrogen and being capable of maintaining a large quantity of the gas even though heating to temperatures much higher than was previously possible and higher than the release and absorption temperature of reservoir 25. For example, yttrium and erbium are absorbers of active gasses and, if hydrogen is the gas in question, hydrides are formed in the metal which can be heated to about 500° C. in vacuum without the loss of appreciable hydrogen. As contrasted with titanium, the range of temperatures within which the hydrides of these and other selected rare earth metals substantially completely decompose in vacuo is approximately 500° C. to 700° C. Accordingly, the selection of one of these metals avoids the necessity of a heater in the trigger assembly and permits the usual evacuation procedures to be used without the additional step of introducing hydrogen gas in the envelope after bakeout. Due to the use of these metals, the hydrogen in the metal hydride is not released even during the bakeout and the additional steps previously necessary are no longer required. While yttrium and erbium are preferred, holmium, lutetium, dysprosium, thulium and scandium are also suitable.

It is noted that, when thick layers are required, peeling of the metal may occur. Therefore, it may be preferred to interpose an intermediate layer of a material such as molybdenum to which the metal adheres.

After layer 19 of the metal has been formed a groove 20 is scored around the circumference of cylindrical portion 18 so as to remove the metal therefrom and expose the insulating ceramic. The position of groove 20 is chosen so that, when cathode electrode 6 is positioned over member 5, the junction between the cylindrical bore 9 and the tapered bore 10 is slightly below the lower edge of groove 20.

Envelope members 2 and 3 may be fabricated from any gas-impervious, non-conducting material which may be hermetically sealed to a metal electrode. Generally, any gas-impervious ceramic may be utilized such as Coors V–200 or American Lava T164. Alternatively, aluminum oxide or forsterite ceramic bodies may be used. It is to be understood, however, that although these specific materials have been enumerated, any gas-impervious ceramic or glass which may be hermetically sealed to metal members may also be utilized.

Electrodes 6 and 7 are fabricated from copper that is substantially free of all gaseous impurities or impurity which upon decomposition, may produce gasses. This copper is such that it meets a standard test, the criterion of which is such that when placed in a vacuumized test chamber, a few liters in volume, and subsequently deeply eroded by a repetitive arcing, as for example, by a voltage of commercial power and current of 100 amperes or more, the pressure level in the container, a few cycles after arcing, does not rise substantially from its initial value, in the absence of getters and pumps, even when the initial value is $10^{-5}$ mm. of mercury or lower. Analytically this requirement may be stated by the relationship that the contact material must contain less than $10^{-6}$ atomic parts of all gasses. Such purity may be achieved by zone-refining in accord with Patent No. 3,234,351—Hebb.

Electrode support members 13 and 16 need not meet this stringent requirement since they are not brought into contact with an electric arc and therefore are not potential sources of vacuum-spoiling gases. They should nevertheless be of copper which is nominally free of oxygen, since, in fabrication, the device is subjected to hydrogen at elevated temperatures and it is undesirable to have oxygen as an impurity in any material exposed at high temperatures to a hydrogen atmosphere.

In fabricating the apparatus of FIGURE 1, the individual constituents are prepared, the cylindrical portion of protruding member 5 of lower end wall member 2 is coated with a metal selected in accord with the present invention, as for example, by vacuum evaporation, or painting with a suitable metallic hydride and firing, and groove 20 is cut therein. The coating 19 may exist in varying thicknesses from approximately 0.001″ to 0.010″. The thickness of the layer depends only upon the number of times the device is expected to fire. If it is to be utilized in an application in which only one or two firings are required, the layer may be quite thin. On the other hand, if the ability to withstand thousands of firings is required, then the upper portion of the listed range should be utilized. This coating serves as a source of hydrogen and the thickness is governed by the amount of hydrogen which is stored therein.

In assembling the device of FIGURE 1, the cathode assembly, including cathode electrode 6 and cathode support member 13, are fastened together, and fitted over coated member 5. After proper positioning of the cathode electrode with respect to the groove in member 5, end cap 11 and conducting pin 12 are placed in position and end cap 11 is hermetically sealed to the upper surface of protruding member 5. The anode assembly, including anode electrode 7, anode support member 16, shield 17, hydrogen reservoir 25, and upper end wall member 4 are assembled. The anode assembly, the cathode end wall assembly and cylindrical sidewall 3 are assembled, with suitable solder shims or metallizing coatings between metal and ceramic members. The assembled members are placed in a suitable furnace and raised to a temperature of approximately 850° C. in a hydrogen atmosphere to cause hermetic seals to be formed between the various members. The device is then cooled.

In one method of charging the device, tubulation 24 is separately connected. As the device cools through the approximate range of 700° C. to 500° C. the metal of coating 19 begins to take on hydrogen and form the metal hydride. At about 500° C. substantially all the metal layer 19 is transformed to the hydride. The device may be evacuated at this temperature after which hydrogen at an appropriate pressure to charge reservoir 25 may be admitted through tubulation 24 and the tubulation sealed. In this embodiment, as the device cools through the range of 300° C. to 200° C. the hydride of titanium is essentially completely formed in reservoir 25 at 200° C. The hydrogen is kept in the envelope as the device cools through this range, during which twice the reservoir is saturated with hydrogen and the envelope, due to an appropriate choice of hydrogen pressure is evacuated to about $10^{-5}$ mm. of Hg or less.

In the simplest and preferred means of forming and charging devices in accord with the invention the quantity of titanium in the reservoir is chosen to be sufficient so that the formation of the hydride of the trigger and the formation of hydride from the titanium of the reservoir takes sufficient hydrogen to lower the pressure within the envelope from a predetermined flushing pressure of hydrogen, as for example, 1 atmosphere, to a hard vacuum of $10^{-5}$ mm. of Hg or less in cooling from a temperature in excess of 700° C. to a temperature of lower than 200° C.

Thus the device may be placed in a flowing hydrogen atmosphere, with tubulation 24 open to furnace atmosphere slowly (250° C. per hour for example) raised to 850° C. to outgas and form seals, flushing with dry hydrogen through one or more tubulations. The tubulations may then be sealed and cooled. As the device is cooled, the required operating pressure is established. Thus for example assuming, negligible quantity of rare earth, 1 gm. of titanium is sufficient to attain a pressure of $10^{-5}$ mm. Hg or less in a device having a volume of 1 liter cooled from 700° C.

The device of FIGURE 1 is, of course, a vacuum gap device. Accordingly, the foregoing steps have been taken in order to insure that the space therein is evacuated to a pressure of $10^{-5}$ mm. of Hg or less during fabrication and, that during operation, its quiescent pressure does not rise above that value.

In the operation of devices of this type, it is imperative that a hard vacuum of $10^{-5}$ mm. of mercury or less be maintained at all times other than during arcing when, of course, the pressure is high. It is for this reason that the electrodes are made of special gas-free copper. The reason for the necessity of the maintenance of this degree of low pressure of all gases is that any rise of pressure within envelope 1 at times other than during arcing is indicative of the presence of ionizable gases. After extinction of the arc between the electrodes of the main gap, such ionized gases reduce the ability of the gap to recover its "hold-off" strength. These gaseous particles do not condense rapidly on the shield as does the copper from the electrodes (which, together with electrons comprise the arc plasma) and hence the recovery time of the device depends strongly upon residual gas pressure.

In the operation of the device of FIGURE 1, a metallic coating 19 upon cylindrical portion 18 of protruding member 5 constitutes a trigger electrode. Accordingly, a triggering circuit, which may conveniently include a suitable capacitor together with means for charging and discharging the same, or a pulse transformer or eqivalent mechanism, is connected between conductor 12 and the periphery of cathode support disc 13. The voltage which is to be switched is connected in the circuit with upper end disc 4 and cathode support disc 13. The specific configuration of the device of FIGURE 1 is, however, designed for insertion into a cylindrical cavity and the fastening of cathode support disc 13 to a metallic member by bolting through holes 22. Similarly, connection to the anode electrode may be made by a bolt in threaded bore 23 within anode support member 16.

In operation, a high voltage which may, for example, range from 3 to 100 kilovolts or higher is connected in circuit with anode electrode 7 and cathode electrode 6. This voltage may be caused to be discharged through electrodes 6 and 7 with great accuracy and timing at any predetermined time by applying a trigger voltage which may vary from 50 volts to 10 kilovolts depending upon the voltage being controlled between trigger electrode 19 and cathode electrode 6, with the trigger electrode positive with respect to the cathode. When a trigger pulse is applied to trigger electrode 19, a spark discharge is initiated across groove 20. This discharge causes a heating of metallic film 19 and a consequent discharge of hydrogen or other active gas into the vicinity of the arc. The hydrogen becomes ionized and a highly conducting arc exists between the opposite side of groove 20. Because of the magnetic forces applied to this arc, it is rapidly propagated upwardly along the tapered inner edge of cathode electrode 6 until it reaches the edge thereof and establishes a cathode spot along the portion of cathode 6 that is parallel with the mating surface of anode 7. Since the electric field between the cathode and anode electrodes is much greater than the field established by the triggering pulse (which is applied to trigger electrode 19), the arc transfers to anode 7 and the main gap breaks down and conducts high currents which are limited only by the external circuit, but which may be in the range of thousands of amperes.

After the useful purpose of the passage of current between cathode 6 and anode 7 has passed, as for example, after a capacitor bank has been discharged, a lightning bolt has been discharged or the first current-zero of an alternating overvoltage occurs, the potential difference between cathode and anode electrode drops essentially to zero and the arc is extinguished. Upon this extinction, the normal conduction carriers within the envelope disappear. These conduction carriers are essentially electrons and ionized copper atoms from the electrodes. The ions diffuse to the electrodes, the shield, or to one of the exposed side or end walls of the device and are deionized and removed from the envelope. The hydrogen ions from the trigger gap are eventually re-absorbed by the metallic film 19 and reservoir 25 in that order. Since the envelope is maintained to a hard vacuum and essentially no ionizable gasses are present, the gap rapidly recovers and is ready to hold off high voltage or perform a switching action almost immediately after the extinction of the arc between electrodes 6 and 7. Typical recovery times for devices constructed in accord with the present invention are from 25 to 100 microseconds after extinction of the arc.

Although this invention is shown and described in connection with two fixed electrodes and a fixed gap, it is noted that the invention is equally applicable to devices wherein the normal position is open circuit and breakdown of the gap is pulsed in accord with the operation of a trigger vacuum gap and the arc initiated thereby may be extinguished by moving a movable electrode into direct physical contact with the other electrode, as for example, in a vacuum switch of the circuit-breaker type or re-closer type.

Since the concept upon which the present invention is predicated has general utility, it is not intended to limit the same to any specific construction of a triggerable vacuum discharge device. For example, the invention may be applied in any of the constructions illustrated in my aforementioned U.S. Patent 3,087,092 or, conveniently, in the embodiment shown in FIGURE 2 of the appended drawing.

In FIGURE 2, a triggerable vacuum discharge device is illustrated at an intermediate stage in the process of fabrication. Specifically, the device is shown inverted from its normally upright position and at a point in the fabrication process immediately prior to the steps of providing a hydrogen atmosphere, brazing of the various seals and final evacuation. The device comprises an envelope 31 which includes a first apertured disc 32, a cylindrical sidewall member 33 and a second apertured disc 34. The apertured disc 32 includes a cylindrical conductive member 35 which supports the trigger assembly for the device and one gap electrode 36. Another gap electrode 37 is disposed in spaced apart relation thereto within envelope 31 to define a primary gap 38. The electrode 36 comprises an annular disc attached for example by welding to cylindrical member 35. The aperture in electrode 36 is tapered outwardly at the exterior portion thereof to provide a bore in the end of the electrode having an interior cylindrical portion 39 and an exterior portion 40.

The trigger assembly of the device is mounted within member 35 and electrode 36 and is supported therefrom by a spinning 41 having a flange 42 which engages the sidewalls of member 35. The trigger assembly comprises a ceramic member 43, the exterior surface of which is coated with a thin layer 44 of a high temperature active gas absorbing metal selected in accordance with the present invention. A cap 45 is mounted on the inner end of the trigger assembly and is affixed thereto so as to be in good electrical contact with layer 44. A wire 46 is brazed or otherwise electrically affixed to the cap 45 within the ceramic member 43 and extends outside the device for connection of the trigger signal source thereto. The case of ceramic member 43 is hermetically sealed with a metal disc 47 through which the wire 46 passes.

Electrode 37 is supported within the device by a solid conductive member 48 which extends through apertured disc 34 and by means of which electrical connection is made to the electrode 37. Apertured discs 32 and 34 are hermetically sealed to sidewall member 33 by means of annular metallic members 49 and 50.

A shield 51 is disposed within envelope 31, supported from sidewall 33 by a flange 52, to protect against deposition of eroded electrode material on the sidewall 33 which might otherwise cause a short-circuit. An exhaust tubulation 53 is also provided so as to permit control of the atmosphere within the envelope during fabrication. An active gas reservoir 54 having the same construction and function as the reservoir 25 of FIGURE 1 is attached to anode support member 48 below anode electrode 37.

As previously mentioned, the device in FIGURE 2 is shown at an intermediate stage in the fabrication process. At this point, the enclosing envelope 31 has been partially completed and hermetically sealed. Rings 54 of an appropriate high temperature solder such as copper-silver (BT) have been placed at each of the remaining points to be sealed. At this point, the device is placed in a furnace and a hydrogen atmosphere is introduced. The furnace is then heated to a first elevated temperature at which the solder melts and flows into the associated joints to complete the sealing of the device. For example, this temperature is approximately 850° C. in the case of the copper-silver solder mentioned. The temperature is then lowered to a second elevated temperature, for example 500° C., at which, by virtue of the use of a metal selected in accordance with the present invention for layer 44 in place of the conventional titanium, hydrogen from the atmosphere is absorbed by the metal and loading of the trigger accomplished. The exhaust tube 53 is pinched off and sealed and the device is removed from the furnace. As the envelope cools further, as described above, the titanium of the reservoir absorbs the remaining hydrogen and is present in sufficient quantity to produce a vacuum of $10^{-5}$ mm. of Hg or less.

During operation of the devices of FIGURES 1 and 2, the establishment of a high current arc is sufficient to cause a sufficient amount of hydrogen to be evolved from the trigger electrode, which is in close proximity to the arc, and the reservoir which is heated more indirectly. When a current zero is reached and the arc is extinguished the metal atoms are immediately condensed on the cold walls. The hydrogen ions are taken up almost as rapidly, first by the trigger electrode coating which absorbs at a higher temperature, and when it is saturated, secondly by the titanium which absorbs at a lower temperature. Since, in any vacuum device there is a tendency for gasses to "clean up" by being covered at the walls by deposited metal, hydrogen disappears during use over a long life of many arcings. Due to the unique combination of devices in accord with the invention however, wherein the titanium reservoir does not absorb gas until most of the gas that the trigger can absorb has been absorbed, the loss of hydrogen from the device is selectively from the titanium reservoir, rather than from the trigger electrode coating. The latter begins to lose its optimum charge of hydrogen only after substantially all the hydrogen has been exhausted from the titanium reservoir. This is in contrast to what would occur if there were no reservoir, or if the reservoir and the trigger electrode coating were of the same metal.

The unique feature of the invention therefore is in the use of an active gas storage metal which evolves and absorbs active gas at a first, higher temperature as the trigger electrode coating and a second active gas storage metal which evolves and absorbs active gas at a second, lower temperature as an auxiliary active gas reservoir.

It is noted that the specific procedural steps set forth above have been chosen merely to exemplify the advantages of the present invention. Alternatively, the method disclosed and claimed in my concurrently filed application, Ser. No. 357,089 may also be used so as to combine the advantages of both inventions. In general, this method comprises providing a layer of gas-charged metal in the trigger rather than the elemental metal, sealing off the device at a high temperature while in a hydrogen atmosphere and then cooling the device so that the metal of the trigger and of the reservoir collects the hydrogen in the device and produces the desired vacuum.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A triggerable vacuum discharge device adapted to be evacuated and charged with an active gas in a single operation and to withstand high operation temperatures without breakdown which comprises:
    (a) an envelope evacuated under quiescent conditions to a pressure of $10^{-5}$ mm. of Hg or less;
    (b) a pair of primary electrodes disposed within said envelope and defining a primary gap therebetween; a trigger electrode comprising a pair of juxtaposed metal-ceramic boundaries located adjacent said gap for injecting charged particles into said gap;
        (bb) the metal of said trigger electrode being a rare earth metal which evolves and absorbs active gas within a first high temperature range under vacuum conditions and being adapted for loading with an active gas at said first high temperature range so as to act as a source of said charged particles;
    (c) an active gas storage reservoir located within said envelope at a point remote from said primary gap but subject to heating by an arc thereacross,
        (cc) said reservoir comprising an active gas storage metal which evolves and absorbs the same active gas as the metal of said trigger electrode under vacuum conditions within a second temperature range lower than said first temperature range;
    (d) means for connecting said primary electrodes in circuit with a voltage source; and
    (e) means for connecting a triggering voltage to said trigger electrode so as to produce said charged particles and initiate a discharge between said primary electrodes.

2. The device of claim 1 wherein said first active gas storage metal is selected from the group consisting of yttrium, erbium, holmium, lutetium, dysprosium, thulium and scandium and said second active gas storage metal is titanium.

3. The device of claim 2 wherein said active gas is hydrogen.

4. The device of claim 1 wherein said first temperature range is approximately 500° C. to 700° C. and said second temperature range is approximately 200° C. to 300° C.

5. The device of claim 2 wherein said first active gas storage metal is yttrium and said active gas is hydrogen.

6. The device of claim 2 wherein both of said electrodes are fixed so as to define a fixed gap.

7. The device of claim 2 wherein one of said electrodes is movable so as to define a variable gap with said other electrode.

8. The device of claim 2 wherein said trigger electrode comprises a ceramic base with a layer of molybdenum overlayed thereupon, a layer of first active gas storage metal overlayed thereupon and a groove cut through said two overlaid metal films to provide a pair of electrically separate regions.

References Cited
UNITED STATES PATENTS

| | | | |
|---|---|---|---|
| 2,948,607 | 8/1960 | Wagener | 313—174 |
| 3,087,092 | 4/1963 | Lafferty | 313—188 X |

JAMES W. LAWRENCE, *Primary Examiner.*

STANLEY D. SCHLOSSER, *Assistant Examiner.*